United States Patent
Blunden

[15] 3,685,856
[45] Aug. 22, 1972

[54] VEHICLE TIE-DOWN FOR HAUL-AWAY TRAILERS

[72] Inventor: Donald J. Blunden, Southfield, Mich.

[73] Assignee: Whitehead & Kales Company, River Rouge, Mich.

[22] Filed: March 5, 1971

[21] Appl. No.: 121,476

[52] U.S. Cl. ........280/179 A, 105/369 A, 248/361 A, 296/1 A
[51] Int. Cl. ..................................B61d 45/00
[58] Field of Search ....105/369 A, 368 J; 248/361 A; 280/179 R, 179 A; 296/1 A

[56] References Cited

UNITED STATES PATENTS

| | | |
|---|---|---|
| 1,770,798 | 7/1930 | Nicholson..........105/368 T X |
| 2,205,273 | 6/1940 | Radey..................105/368 T |
| 3,038,740 | 6/1962 | Blunden.................280/179 A |
| 3,473,487 | 10/1969 | Blunden.................105/369 A |
| 3,564,577 | 2/1971 | Blunden et al.........105/369 A |
| 3,566,803 | 3/1971 | Blunden et al.........105/369 A |

*Primary Examiner*—Leo Friaglia
*Attorney*—Whittemore, Hulbert & Belknap

[57] ABSTRACT

A vehicle tie-down structure for securing a vehicle upon the deck of a haul-away trailer, comprising a flexible element adapted to be connected to the vehicle and a ratchet shaft for tensioning the flexible element. A carriage is locked in adjusted position to a channel anchored lengthwise upon the deck. The carriage has a guide portion engaging the flexible element between the ratchet shaft and the vehicle to determine the direction of the tension applied to the vehicle.

10 Claims, 8 Drawing Figures

PATENTED AUG 22 1972

INVENTOR.
DONALD J. BLUNDEN
BY
Whittemore, Hulbert & Belknap
ATTORNEYS

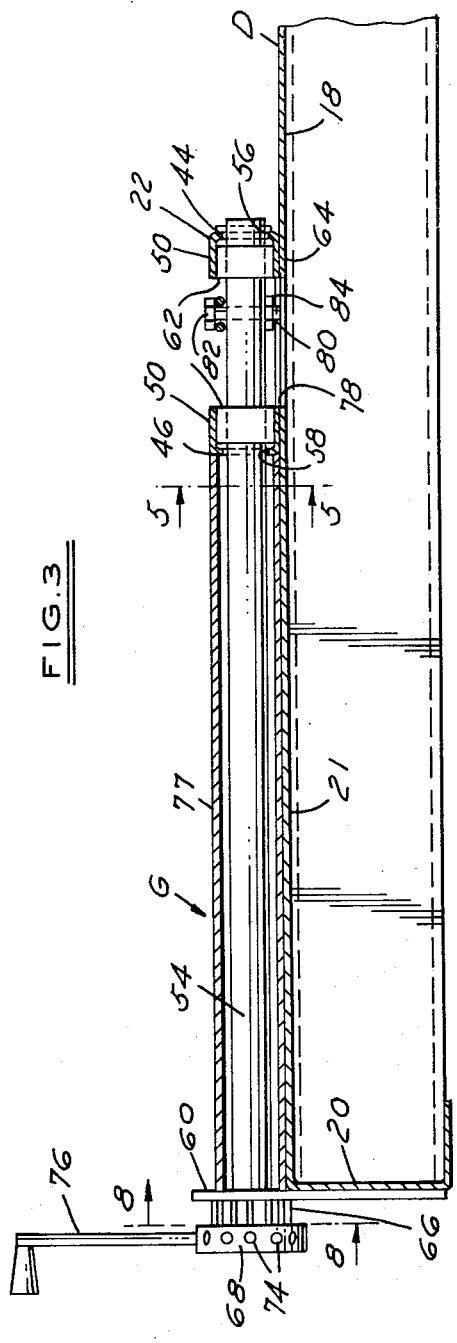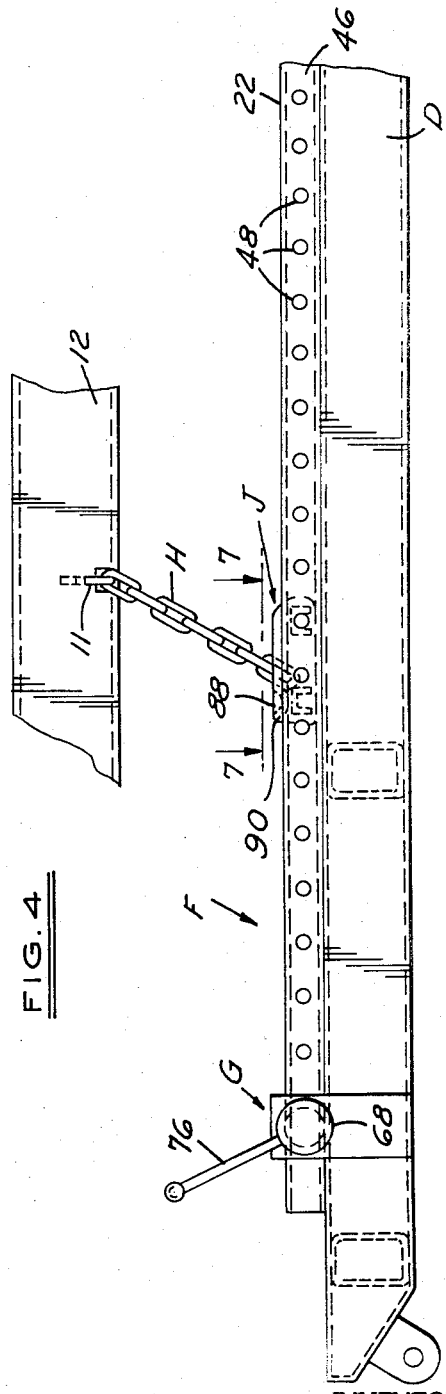

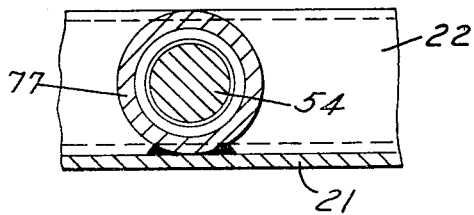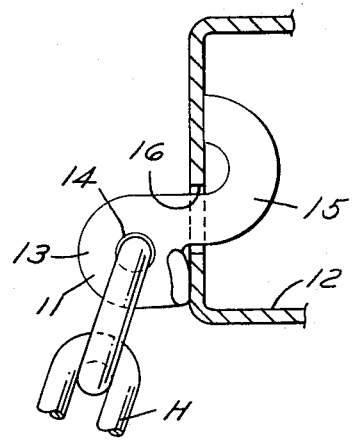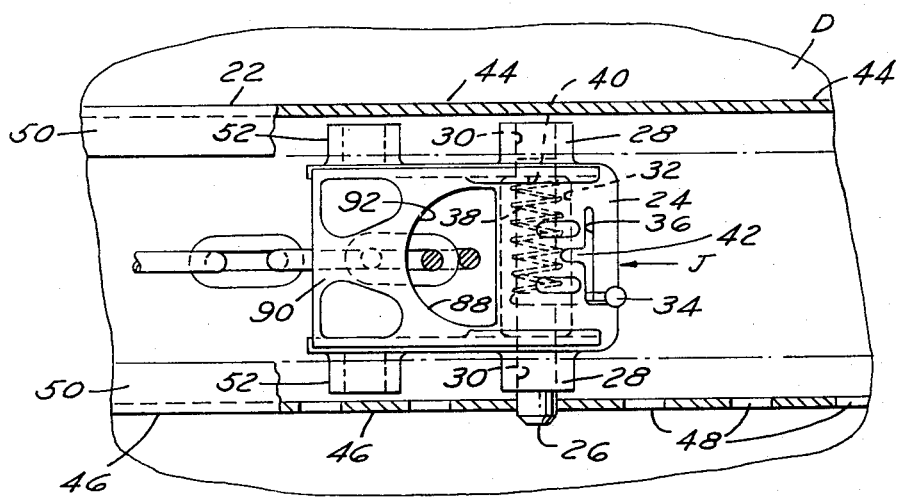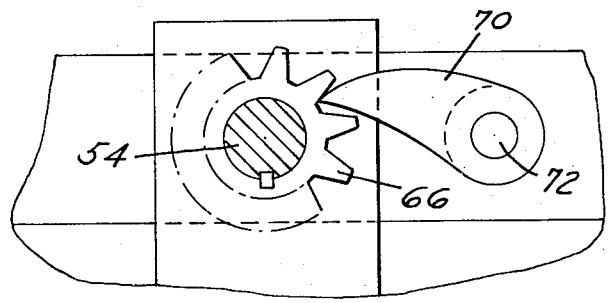

1

VEHICLE TIE-DOWN FOR HAUL-AWAY TRAILERS

BACKGROUND AND SUMMARY OF THE INVENTION

A vehicle is usually tied down by four chains secured to the four corners of the vehicle, each held in tension by a ratchet shaft. However, because of the great variety of makes and lengths of vehicles, it has been necessary to provide many more than four chains and ratchet shafts, and to place them so that at least some will be in the right position for the chains to hook onto the vehicle frame. The large number of ratchet shafts and chains required has greatly increased the cost of the tie-down systems, and even then it is sometimes impossible to find four perfectly placed ratchet shafts for tying down certain vehicles.

Accordingly, one object of this invention is to provide a vehicle tie-down structure for a haul-away trailer which avoids the necessity of providing an excessive number of ratchet shafts and chains.

Another object of the invention is to provide a vehicle tie-down structure which is less costly than tie-down structures heretofore employed on haul-away trailers.

Another object is to provide a vehicle tie-down structure having an adjustable carriage in association with each ratchet shaft, the carriage having a guide portion for engaging the chain between the shaft and the vehicle to which it is connected to determine the direction of the tension applied to the vehicle.

Another object is to provide a longitudinally extending channel anchored lengthwise upon a longitudinally extending deck of the trailer by means of which the carriage is mounted in adjustable position.

Another object is to provide an adjustable tie-down that allows the remaining deck structure to be essentially drip free.

Other objects and features of the invention will become apparent as the description proceeds, especially when taken in conjunction with the accompanying drawings, wherein:

FIG. 3 is an enlarged fragmentary sectional view taken on the line 3—3 in FIG. 2.

FIG. 4 is a fragmentary side elevational view on an enlarged scale of a portion of the deck shown in FIG. 2.

FIG. 5 is a fragmentary sectional view taken on the line 5—5 in FIG. 3.

FIG. 6 is a fragmentary view partly in section and partly in elevation showing a tie-down chain hooked to a portion of the frame of a vehicle secured upon the deck of the trailer.

FIG. 7 is a fragmentary view with parts broken away and in section taken on the line 7—7 in FIG. 4.

FIG. 8 is a view partly in section and partly in elevation taken on the line 8—8 in FIG. 3.

Figure 1:
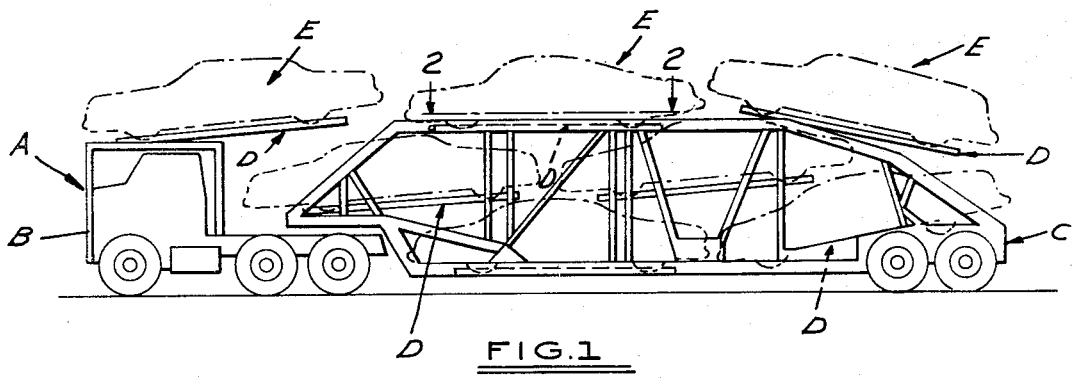
FIG. 1 is a semi-diagrammatic view in side elevation of a vehicle haul-away trailer having the vehicle tie-down structure of my invention.
Figure 2:
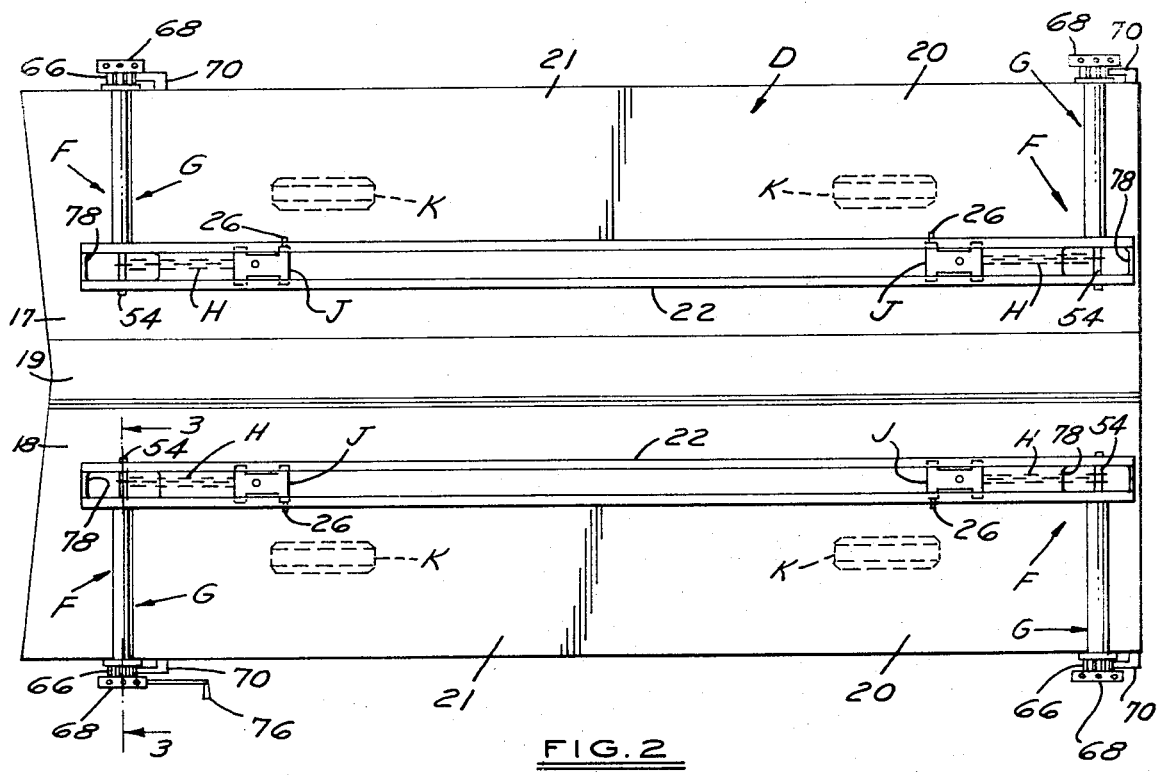
FIG. 2 is an enlarged fragmentary view taken on the line 2—2 in FIG. 1 and showing in plan a deck of the trailer and the four tie-down structures employed to secure a vehicle upon the deck.

Referring now more particularly to the drawings, A is a transport vehicle, in this instance a vehicle haul-away trailer, including a tractor B and a trailer C. The trailer has a plurality of decks D upon each of which a vehicle E may be secured. Tie-down structures F are provided for securing the vehicles on the decks, each comprising a tensioning device G, a flexible element or chain H and a carriage J. The four wheels K of a vehicle are shown in FIG. 2 supported upon the tracks of one of the decks D.

Preferably four tie-down structures F are provided for tying down a vehicle on each deck, and as best seen in FIGS. 4 and 6 a hook 11 is secured at one end of each chain H for attachment to the frame 12 of the vehicle E. The hook 11 may be of any suitable construction, for example S-shaped as shown having a body portion 13 provided with an eye 14 to which the end of the chain is attached and having a generally U-shaped portion 15 adapted to extend through a hole 16 in the vehicle frame 12.

The deck D may as shown be formed of two elongated generally flat deck sections 17 and 18 centrally overlapped at 19 and having downturned flanges 20 along opposite edges. The deck has the elongated laterally spaced parallel wheel tracks 21 which are in this instance formed integral with the deck sections 18 and 19. A pair of channels 22 are mounted on the deck lengthwise thereof disposed in laterally spaced parallel relation to one another. The channels 22 respectively extend along the inboard edges of the tracks 21. The channels 22 are rigidly secured to and serve effectively as reinforcements for the deck D to prevent the deck from bending or buckling under the load of the vehicle thereon. Such channels 22 may also serve as guides for the vehicles while they are being loaded onto or unloaded from the supporting deck D.

The adjustable carriages J are slidable lengthwise of and supported in the channels 22. These carriages are preferably arranged in transversely aligned pairs at longitudinally spaced points adjacent to corner points of the vehicle frame to which the chains H are hooked.

Each adjustable carriage J includes a frame or body 24 which may be a metal casting for example, and a transversely extending lock pin 26. The lock pin 26 is an elongated cylindrical member which extends transversely of the carriage frame and is mounted thereon for rotation and for axial sliding movement. The carriage frame 24 has a pair of aligned laterally outwardly extending bosses 28 which project from the sides of the frame at one end thereof. The end portions of the lock pin 26 are slidably and rotatably received in aligned cylindrical passages 30 in the bosses 28 and the intermediate portion of the lock pin extends across a cavity 32 within the carriage frame 24.

A handle in the form of a transverse pin 34 is secured to an intermediate portion of the lock pin 26 and extends through an elongated transverse slot 36 in the end wall of the carriage frame 24. A coil spring 38 encircles the lock pin and is compressed between the handle 34 and an interior wall 40 of the cavity 32 as to urge the lock pin 26 to its extended position as viewed in FIGS. 2 and 7 in which the handle 34 engages one end of the slot. The slot 36 will be seen to be generally T-shaped having an intermediate offset detent portion 42 for receiving the handle 34 when the lock pin is retracted and rotated, to retain the lock pin in retracted position.

Referring again to the channels 22, each channel has parallel upstanding side walls 44 and 46. The outer side wall 46 has a series of equally spaced holes 48 formed along the length thereof. The lock pin 26 is of a slightly smaller diameter than holes 48 so as to be free to enter one of the holes and lock the carriage in adjusted position against longitudinal movement.

The upstanding side walls 44 and 46 of the channels 22 terminate in horizontal inturned flanges 50 which overlie the bosses 28 of the carriage. It will be noted that the carriage frame 24 also has laterally outwardly extending bosses 52 at the opposite end thereof and generally similar to the bosses 28. The flanges 50 extend over the bosses 52 as well as the bosses 28 to prevent the carriages from lifting out of the channels.

As stated, each tie-down device F includes in the preferred embodiment a tensioning device G which has an elongated shaft 54 that may extend over a track 21 at right angles thereto. Each shaft 54 extends through transversely aligned holes 56 and 58 in a channel 22. The outer end of the shaft 54 is journaled for rotation in a bearing plate 60 secured to the flange 20 of the deck D. The inner end portion of each shaft 54 is journaled for rotation in bearings 62 which are respectively supported within the channel and secured to the base 64 and flanges 50 thereof.

The shaft 54 extends through the bearing plate 60 and has on the outboard side a ratchet gear 66 and an enlarged drive hub 68. A ratchet pawl 70 is pivoted to the outer edge of the deck D by a pin 72 adjacent each ratchet gear 66 in position to engage the teeth of the ratchet gear so as to permit rotation in one direction but to prevent rotation in the reverse direction. In FIG. 8, counterclockwise rotation is permitted. The hub 68 is formed with a circular series of holes 74 into any one of which a crank 76 may be inserted to rotate the shaft 54. A tube 77 may be sleeved over the shaft 54 so that the wheels of a vehicle may pass over the tensioning device G without contacting the shaft 54. The tube 77 is concentric with and of substantially greater diameter than shaft 54 so that the shaft may rotate freely. The tube 77 extends from bearing plate 60 to channel 22 and may be welded or otherwise permanently secured to the track 21.

The chain H of each tensioning device has one end secured to the shaft 54 by a suitable fastener assembly 80. In the present instance, the fastener assembly 80 includes a bolt 82 extended through the end link of the chain. The bolt 82 extends through a transverse hole in the shaft and is secured thereto by a nut 84. The chain is thus secured to the shaft 54 in the space within the channel 22, that is between the side walls thereof. The base 64 of channel 22 and the wheel track 21 have registering openings 78 beneath shaft 54 to clear the build-up of chain that accumulates on the shaft.

The chains will be understood to extend from the shafts 54 to their free ends which are adapted to be hooked to the frame of the vehicle as shown in FIGS. 4 and 6. The carriages J are formed to provide guide portions 88 which engage and guide the intermediate portions of the chains. In the present instance, the guide 88 as seen in FIG. 4 consists of an elevated open-ended top wall portion 90 of the carriage frame 24 and a hole 92 adjacent to the top wall portion. The intermediate portion of the chain extends under the top wall portion 90 and is guided up through the hole 92 to the point where it is hooked onto the vehicle. Thus the carriage, depending on its relative position in the channel, determines the direction of tension applied to the vehicle frame by each chain.

The operation of the tie-down structure should be clear from the foregoing. The vehicles are loaded on the decks in a conventional manner, passing over tubes 77 without contacting shafts 54. The ratchet pawls 70 are turned away from the ratchet gears 66 so that the shafts 54 may be reverse rotated to let out an adequate length of chain H. The carriages J are then adjusted longitudinally in the channels 22 after first retracting the lock pins 26 by means of the handles 34 which may be held in the detent portions 42 of the T-shaped slots 36 to retain the lock pins in retracted position. When the carriages are thus located in the desired positions of longitudinal adjustment the handles 34 are released from the detent portions 42 of the slots 36, and the springs 38 will operate to extend the lock pins 26 through registering holes 48 in the channels, locking the carriages in longitudinally adjusted position.

The chains H passing through the guide portions 88 of the carriages will have their hooks 11 attached to the frame 12 of the vehicle, and the shafts 54 may be rotated by the insertion of the crank 76 in a hole 74 of the drive hub 68 to tension the chain. The ratchet pawl 70 will drop by gravity into the space between teeth of the associated gears 66 to prevent accidental reverse rotation of the shafts 54. Tensioning of the chains of the tie-down devices will compress the springs of the vehicle enough to hold the vehicle securely on the tracks and also to reduce the overall height of the haulaway trailer so as to clear viaducts, bridges and the like.

By properly positioning the carriages J in relation to the portions of the vehicle frame to which the chain hooks are to be connected, the direction of the tension applied to the vehicle by the chains can be determined for optimum results even though the shafts 54 upon which the chains are wound are spaced a considerable distance therefrom.

It will be understood from the foregoing that my tie-down system permits the use of a substantially solid deck which is stronger and more economical to manufacture, and which has the further advantages of being relatively safe for personnel to walk on and preventing drippage on vehicles below.

What I claim as my invention is:

1. A vehicle tie-down structure, comprising a longitudinally extending channel anchored lengthwise upon a longitudinally extending deck of a vehicle haulaway trailer parallel to and inboard of a wheel track of the deck, a carriage carried by and adjustable lengthwise of said channel, releasable means for locking said carriage to said channel in longitudinally adjusted position, a flexible element adapted to be connected to the vehicle on such deck of the trailer, a transverse rotatable shaft mounted in fixed position across the wheel track, said flexible element being connected to said shaft so that rotation of said shaft will tension said flexible element, and releasable ratchet means for preventing reverse rotation of said shaft, said carriage having a guide portion engaging said flexible element between said shaft and the vehicle to which it is adapted to be connected to determine the direction of the tension applied to the vehicle by said flexible element.

2. The structure defined in claim 1, wherein said shaft extends through transversely aligned holes in the side walls of said channel and said flexible element is connected to said shaft between said side walls.

3. The structure defined in claim 2, wherein the base of said channel is cut away to clear the build-up of said flexible element wound on said shaft.

4. The structure defined in claim 3, wherein said shaft is positioned above the wheel track, bearings on said channel and at the outboard side of the wheel track supporting said shaft for rotation, and cover means for said shaft over which the wheels of a vehicle may pass during loading and unloading without contacting said shaft, said cover means comprising a tube extending from said channel to said bearing at the outboard side of the wheel track.

5. A vehicle tie-down structure, comprising a longitudinally extending channel anchored lengthwise upon a longitudinally extending deck of a vehicle haul-away trailer and having upright side walls one of which is provided with a plurality of longitudinally spaced openings and both of which have inturned flanges along their upper edges, a carriage carried by and adjustable lengthwise of said channel, said carriage having side portions extending under said inturned flanges to prevent said carriage from lifting out of said channel, a transverse lock pin axially slidably mounted on said carriage for movement between an extended position adapted to project through a selected opening in said one upright side wall of said channel to lock said carriage in longitudinally adjusted position and a retracted position so as to be withdrawn from the latter opening, a flexible element adapted to be connected to the vehicle on such deck of the trailer, a transverse rotatable shaft mounted in fixed position on the deck and to which said flexible element is connected so that rotation of said shaft will tension said flexible element, and releasable ratchet means for preventing reverse rotation of said shaft, said carriage having a guide portion engaging said flexible element between said shaft and the vehicle to which it is adapted to be connected to determine the direction of the tension applied to the vehicle by said flexible element.

6. The structure defined in claim 5, wherein said transverse shaft is mounted above the deck of the trailer, and cover means are provided for said shaft over which the wheels of a vehicle may pass during loading and unloading without contacting said shaft.

7. The structure defined in claim 5, wherein said transverse shaft is mounted above the deck of the trailer and extends through transversely aligned holes in said upright side walls of said channel, and said flexible element is connected to said shaft between said upright side walls, the base of said channel being formed to clear the build-up of said flexible element wound on said shaft.

8. The structure defined in claim 5, wherein the deck includes an elongated wheel track, said channel extending parallel to and inboard of the wheel track, said transverse shaft being mounted above the deck of the trailer and extending across the wheel track through transversely aligned holes in said upright side walls of said channel, said flexible element being connected to said shaft between said upright side walls, and cover means for the portion of said shaft extending across the wheel track over which the wheels of a vehicle may pass during loading and unloading without contacting said shaft.

9. The structure defined in claim 8, wherein bearings on said channel and at the outboard side of the wheel track are provided for said shaft, said cover means comprising a tube secured to the wheel track and extending between said channel and said bearing at the outboard side of the wheel track.

10. The structure defined in claim 9, wherein the base of said channel is apertured to clear the build-up of said flexible element wound on said shaft.

* * * * *